Nov. 18, 1952 C. L. ACKERMAN 2,618,695

TELEVISION PICTURE WINDOW CONSTRUCTION

Filed Jan. 18, 1951 3 Sheets-Sheet 1

INVENTOR.
CARL L. ACKERMAN.
BY
Alden D. Redfield
Charles M. Hogan
ATTORNEYS.

Nov. 18, 1952 C. L. ACKERMAN 2,618,695

TELEVISION PICTURE WINDOW CONSTRUCTION

Filed Jan. 18, 1951 3 Sheets-Sheet 2

INVENTOR.
CARL L. ACKERMAN.
BY
Alden D. Redfield
Charles M. Hogan.
ATTORNEYS.

Nov. 18, 1952 C. L. ACKERMAN 2,618,695

TELEVISION PICTURE WINDOW CONSTRUCTION

Filed Jan. 18, 1951 3 Sheets-Sheet 3

INVENTOR.
CARL L. ACKERMAN.
BY Alden D. Redfield
Charles M. Hogan.
ATTORNEYS.

Patented Nov. 18, 1952 2,618,695

UNITED STATES PATENT OFFICE 2,618,695

TELEVISION PICTURE WINDOW CONSTRUCTION

Carl L. Ackerman, Mount Healthy, Ohio, assignor to Avco Manufacturing Corporation, Cincinnati, Ohio, a corporation of Delaware Application January 18, 1951, Serial No. 206,573

3 Claims. (Cl. 177—318)

The present invention relates to improvements in television receiver picture window constructions.

The prior art includes a number of picture window constructions for television receivers, those appearing early in the development of the art consisting only of a cut-out opening with a vertically oriented pane of glass disposed thereacross, and those produced at later stages of development of the art placing greater emphasis on appearance. It is an object of the present invention to provide a picture window construction which affords a wide angle of view, is decorative and attractive in appearance, is removable to permit ready access to both the cathode ray tube base and the rear side of the picture window to permit cleaning thereof, defines and masks the picture opening, and at the same time maintains the picture window in such a position that glare is minimized.

For a better understanding of the present invention, reference is made to the following description of the accompanying drawings, in which there is shown a preferred illustrative form of picture window construction in accordance with the invention.

Figure 3:
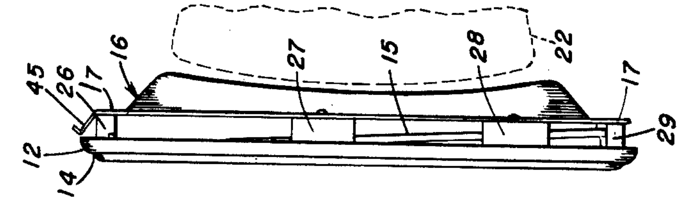
Fig. 3 is an elevational view of the right side of the window construction.
Figure 2:
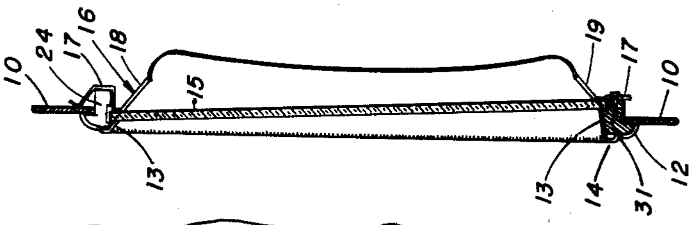
Figure 1:
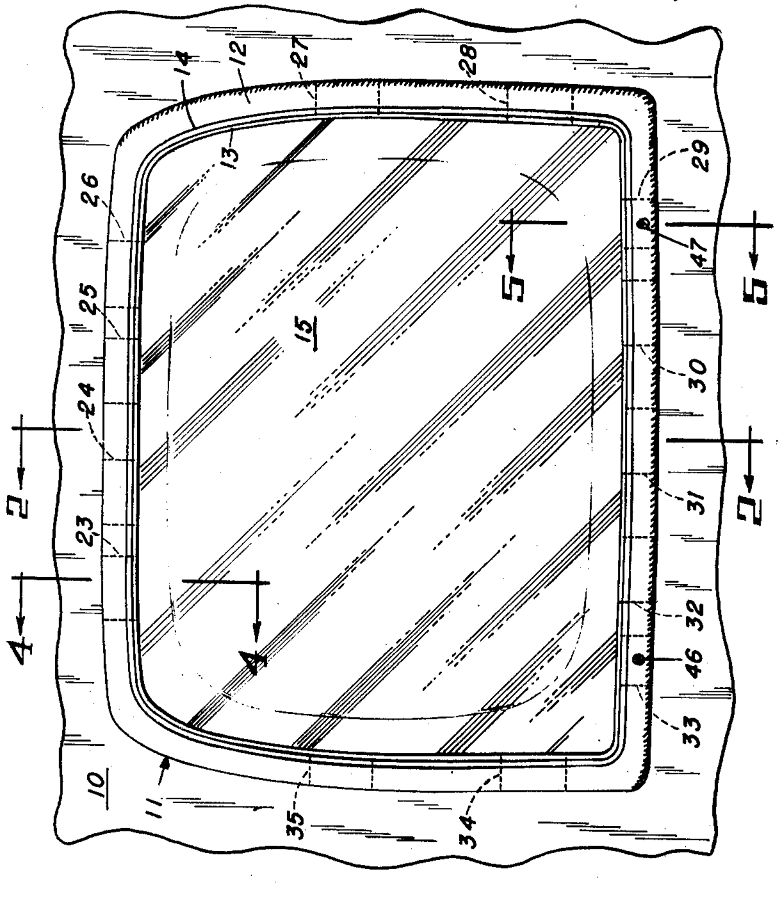
Fig. 1 is a front view of the improved picture window construction which the invention features.
Figure 4:
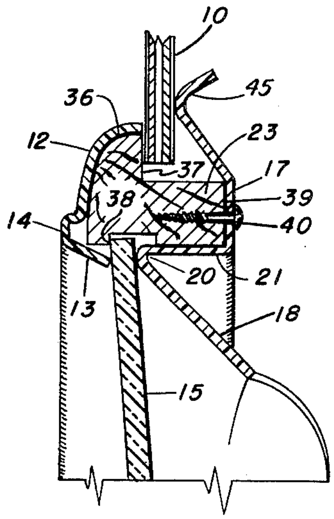
Figure 5:
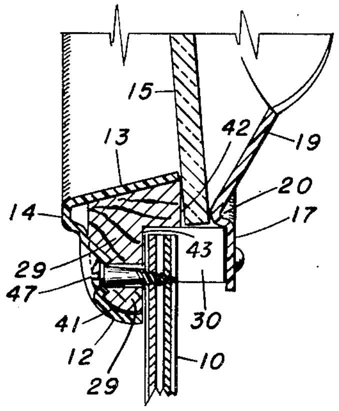
Figures 6, 7, 8:
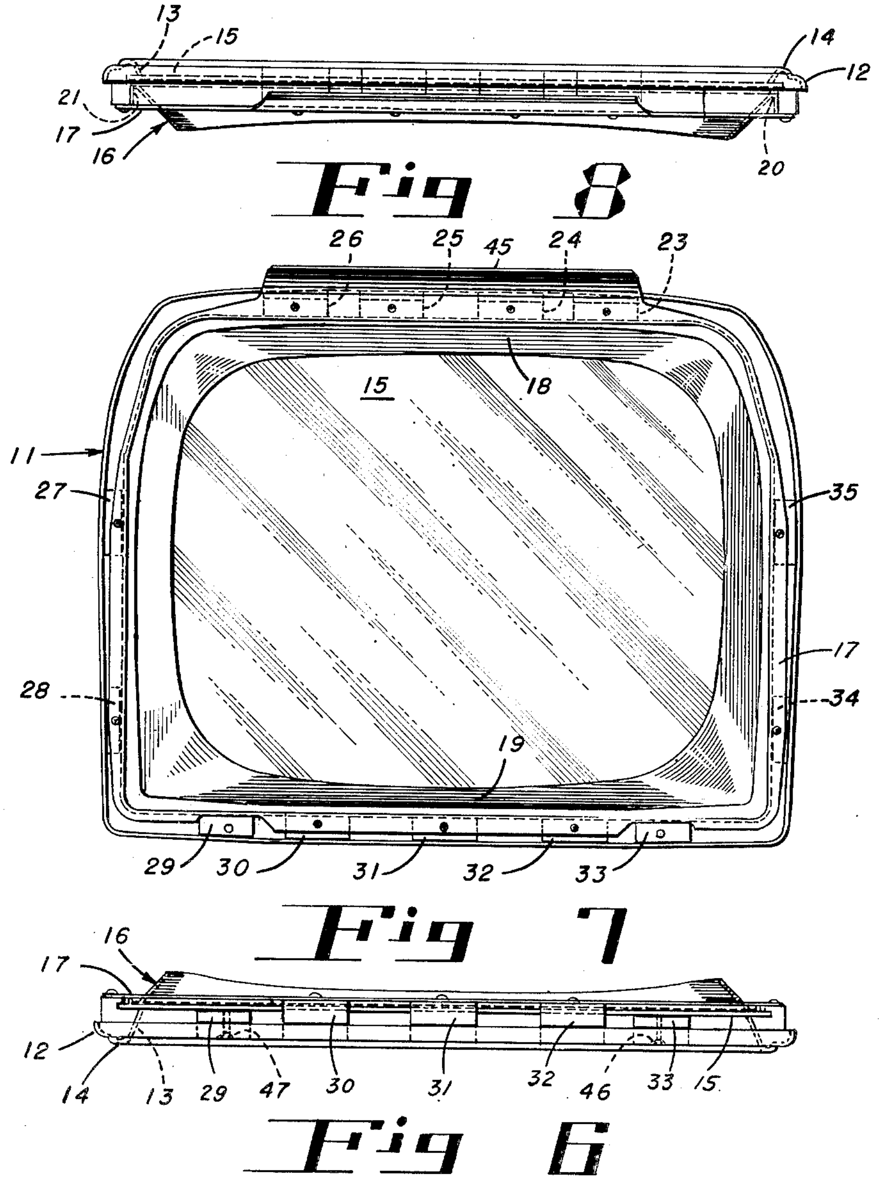

Figs. 2, 4, and 5 are sectional views taken along the section lines 2—2, 4—4, and 5—5 of Fig. 1, respectively, in each case looking in the direction of the arrows;

Fig. 7 is a rear view of the picture window construction illustrated in Fig. 1;

Fig. 8 is a top view as seen by an observer standing above and to the rear of the picture window; and Fig. 6 is a bottom view of the construction illustrated in Fig. 7;

A generally rectangular opening is formed in the vertical front panel 10 of a television receiver cabinet. This opening is concealed by a generally rectangular molding 11 which may optionally have a decorative theme as follows: an outer margin 12, an inner margin 13, and a central bead 14. This particular decorative theme is featured in several models of television receivers marketed by the Crosley Division of the assignee of the present application and invention, the Avco Manufacturing Corporation, wherein the elements 12, 13, and 14 are collectively referred to as the "Proscenium Arch," margin 12 being finished in mahogany, bead 14 in gold, and margin 13 in gray. Sectionally, margin 12 curves laterally outwardly and then rearwardly from bead 14 until its edge terminates adjacent to the margins of the opening provided in cabinet 10. The margin 13 of the molding 11 converges inwardly and laterally toward the window pane 15 until its inner edge terminates adjacent the window pane. It will be seen from an inspection of Figs. 2, 4, and 5 that the lower generally horizontally extending run of the margin 13 is wider in a front to back direction than the upper generally horizontally extending run of that margin, so that the window pane 15 is tilted downwardly and inwardly, the purpose of such tilting being to minimize glare from reflected light.

It will be understood that any suitable decorative theme may be utilized in the molding 11, applicant preferring those general themes shown and described in U. S. Design Patents 161,530, 161,531, 161,532, and 161,533, issued January 2, 1951, and owned by the assignee of the present application and invention, these designs being marketed under the title "Proscenium Arch." Reference is made to these patents for a number of decorative themes suitable for molding 11.

In accordance with a feature of the present invention, the window pane 15 is positioned between the molding member 11 and a decorative mask member 16, which performs a number of functions: First, the definition of the picture opening; second, the provision of a decorative convergent "stage" around the opening; third, the positioniing of window pane 15; fourth, locking the removable assembly of molding, mask member, and window pane in place. The mask member is provided with an integral circumferential outer marginal flange 17. The outermost rim of this flange is generally rectangular, but it has rounded corners, as seen in Fig. 7. The main body of the mask 16 diverges or flares outwardly away from the cathode ray tube 22 as indicated at 18 and 19 in Figs. 4 and 5, respectively, terminating forwardly in a shoulder 20 which frontally abuts the window pane 15 and by complementary compressive action with margin 13 of molding 11 holds the window pane 15 in place. The upper portion of flange 17, as illustrated in Fig. 4, is set back from shoulder 20 by an integral rearwardly extending portion 21 of the mask member, the width of this rearwardly extending portion 21 diminishing to zero at the lowest portion of the window pane, as illustrated in Fig. 5, whereat shoulder 20 is formed by a groove. Since the mask member diverges outwardly toward the front, it simulates the appearance of a stage in front of the cathode ray tube 22 and affords a wide angle of view to the observer.

Glued to the rear side of the molding are wooden blocks 23 through 35. Each of the blocks, with the exception of blocks 29 and 33, is formed with an arcuate forward bearing surface 36 which abuts against and is secured by glue to the inner side of margin 12, a cut-out upper integral shoulder 37 which abuts against the margin of the cabinet opening, an integral lower cut-out shoulder 38 which abuts against the front surface of window pane 15 (the references to "upper" and "lower" referring to Fig. 4), and a rear surface 39 which abuts against the front surface of flange 17. A screw such as that illustrated at 40 is driven through flange 17 into block 23 to clamp together the mask member 16 and the molding 11, the shoulder 38 and the compression between margin 13 and shoulder 20 maintaining window pane 15 in place. It will be understood that each of the blocks 23 through 35 inclusive, with the exception of blocks 33 and 29, is similarly appropriately secured to flange 17 by screws and is generally similar in construction to block 23 just described in detail.

Blocks 29 and 33 are identical, block 29 being illustrated in Fig. 5. Block 29 is provided with the usual bearing surface 41, abutting and glued to the inner side of margin 12, and with a rear surface 42 abutting against window pane 15 and a cut-out shoulder 43 abutting against cabinet panel 10. The assembly of window pane 15, mask member 16, molding member 11, and the blocks other than 29 and 33 is maintained in position by an integral upwardly extending lip 45 centrally and upwardly formed by an extension of flange 17 of the mask member and by two screws 46 and 47 driven through the outer margin 12 and blocks 33 and 29, respectively, into the front panel 10 of the cabinet (Fig. 5). When the screws 46 and 47 are removed, the subassembly is simply tilted outwardly and pulled downwardly to disengage it from the front panel 10 and to remove it from the television receiver cabinet.

This construction is particularly advantageous, not only because of its ready removability, pleasing appearance, and durability, but also because of the downwardly and rearwardly sloping position in which window pane 15 is maintained, glare thereby being minimized.

While there has been shown and described what is at present considered to be the preferred embodiment of the invention, it will be obvious to those skilled in the art that various modifications and substitutions of equivalents may be made therein without departing from the scope of the appended claims.

I claim:

1. In a television picture window construction for a television receiver cabinet of the type having an opening formed in the front thereof to expose a cathode ray tube screen, the combination of a decorative molding adapted to be disposed in front of the edges of said opening to conceal the same, a transparent pane disposed behind the inner margin of said molding, a picture-defining mask member, means for securing said pane in a sandwich-like assembly between said molding and said mask member, and means for securing the assembly of molding, pane, and mask member to said cabinet, said mask member being formed with an outer flange and a forwardly extending shoulder inwardly of said flange, said shoulder abutting against the rear surface of said pane and sloping downwardly and outwardly, the side portions of the inner margin of said molding member being tapered to tilt said pane inwardly with respect to the front of said cabinet.

2. A device in accordance with claim 1 in which said mask member comprises an integral flared portion converging inwardly toward the picture tube and away from said shoulder.

3. In a television picture window construction for a television receiver cabinet of the type having an opening formed in the front thereof to expose a cathode ray tube screen, the combination of a decorative molding adapted to be disposed in front of the edges of said opening to conceal the same, a transparent pane disposed behind the inner margin of said molding, a picture-defining mask member, means for securing said pane in a sandwich-like assembly between said molding and said mask member, and means for securing the assembly of molding, pane, and mask member to said cabinet, the means for securing the molding and pane and mask member together comprising a plurality of clamping blocks each formed with a front bearing surface secured to said molding and integral shoulders engaging said pane and the edge of said opening, said mask member being formed with an outer flange secured to said blocks.

CARL L. ACKERMAN.

REFERENCES CITED

The following references are of record in the file of this patent:

UNITED STATES PATENTS

| Number | Name | Date |
|---|---|---|
| 2,470,620 | Jackson | May 17, 1949 |
| 2,545,348 | Fabel | Mar. 13, 1951 |

FOREIGN PATENTS

| Number | Country | Date |
|---|---|---|
| 520,412 | Great Britain | Apr. 23, 1940 |